(No Model.)

A. B. HENDRYX.
FISHING REEL.

No. 473,665. Patented Apr. 26, 1892.

Witnesses
J. H. Shumway
Lillian D. Kelsey

Amarin B. Hendryx
Inventor
By atty
Earle Seymour

THE NORRIS PETERS CO., PHOTO-LITHO., WASHINGTON, D. C.

UNITED STATES PATENT OFFICE.

ANDREW B. HENDRYX, OF NEW HAVEN, CONNECTICUT.

FISHING-REEL.

SPECIFICATION forming part of Letters Patent No. 473,665, dated April 26, 1892.

Application filed March 14, 1892. Serial No. 424,795. (No model.)

*To all whom it may concern:*

Be it known that I, ANDREW B. HENDRYX, of New Haven, in the county of New Haven and State of Connecticut, have invented a new Improvement in Fishing-Reels; and I do hereby declare the following, when taken in connection with accompanying drawings and the letters of reference marked thereon, to be a full, clear, and exact description of the same, and which said drawings constitute part of this specification, and represent, in—

Figure 1:
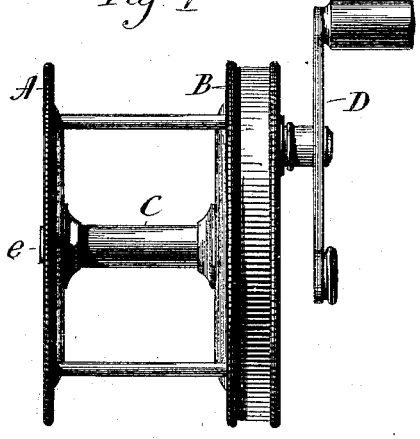
Figure 2:
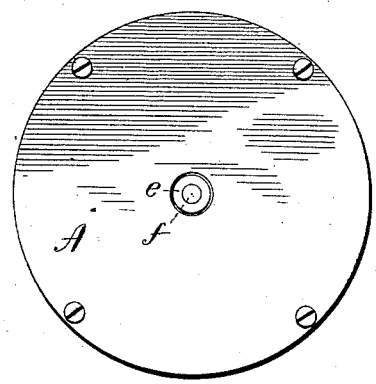
Figure 3:
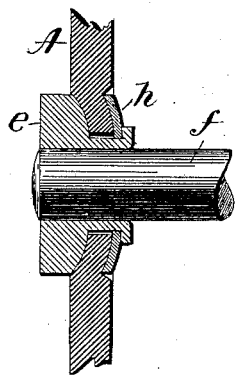
Figure 5:
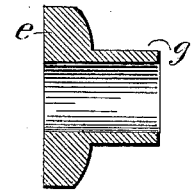
Figure 4:
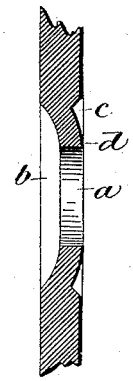
Figure 6:

Figure 1, a side view of a reel embodying the invention; Fig. 2, an end view of the same looking toward the head opposite the crank; Fig. 3, a vertical central section through the central portion of the head and bearing; Fig. 4, a vertical section of the same portion of the head with the bearing removed; Fig. 5, a longitudinal central section of the bearing-piece detached; Fig. 6, a longitudinal central section of the collar. Figs. 3, 4, 5, and 6 are enlarged for the purpose of illustration.

This invention relates to an improvement in that class of fishing-reels in which the frame is composed of a pair of heads connected by rods or pillars, and between which heads the spool is hung, the arbor of the spool taking a bearing in each of the heads. In the construction of this class of reels it is necessary that the bearings for the shaft be formed before the heads are set together. In uniting the two heads by means of the rods or pillars which connect them it is extremely difficult to bring the two holes formed for the bearings of the spool-arbor into such direct line as to give perfect freedom to the revolution of the shaft, and it is also extremely difficult to ream the holes after the two heads are secured together, so as to bring them into perfect alignment to remain so, for the reason that after the holes are so reamed it is necessary to separate the two heads for the introduction of the spool and its arbor, and in replacing the same after such separation they are liable to be thrown out of alignment and cause the arbor to bind to a greater or less extent.

The object of my invention is to provide a bearing in the heads for the arbor of the reel which will adjust itself into alignment with the arbor and so as to permit perfect freedom of revolution to the arbor and spool; and the invention consists in the construction of the bearings, as hereinafter described, and particularly recited in the claim. In general appearance the reel does not differ from the common construction of reels.

A represents one head, and B the other head, within which the multiplying gearing is introduced; C, the spool, and D the crank, by which revolution is imparted to the spool, all of substantially the usual construction. At the center of each of the heads a hole $a$ is made, considerably larger in diameter than the diameter of the arbor, and in one of the surfaces, preferably the inner surface, around the hole a concave recess $b$ is formed. (See Fig. 4.) On the reverse side a convex recess $c$ is formed. These concave and convex recesses produce a flange $d$ around the hole of concavo-convex shape. The bearings for these holes in the head are made as seen in Fig. 5, and consist of a disk $e$, preferably flat upon its face, but its reverse side convex, corresponding to the concave recess $b$ in the head. This disk is bored of a diameter corresponding to the diameter of the arbor. In Fig. 3 the arbor is represented as $f$. Upon the convex side of the bearing-piece and around the hole is a flange $g$. The bearing-piece, therefore, is of eyelet shape, the flange $g$ corresponding to the tubular shank of the eyelet. The external diameter of the shank $g$ of the bearing is somewhat less than the internal diameter of the hole $a$ through the head. The bearing-piece is set through the hole in the head. Then over the tubular shank a collar $h$ is placed, the collar having a concave surface corresponding to the convex surface $c$ around the bearing, as seen in Figs. 3 and 6. The shank or flange of the bearing extends through this collar and its end is upset over onto the collar $h$, as seen in Fig. 3, thus firmly securing the bearing-piece to the head. Owing to the concavo-convex shape of that portion of the head directly around the bearing and the corresponding shape of the bearing-piece and collar, a limited extent of rocking movement is permitted the bearing-piece, as seen in Fig. 3. This rocking movement is alike radial in all directions. Each of the heads being provided with a bearing of this character, the arbor $f$ is introduced, and if at such introduction the bearings are not in direct alignment the passage of the arbor through the bearings will bring the bearing-pieces into their proper alignment with relation to the arbor and so that the arbor will run perfectly free, and no possible disadjustment of the heads with relation to each other and to the arbor can prevent the bearing-pieces coming into alignment with the shaft when the shaft is introduced.

While it is preferred to upset the end of the tubular shank or flange of the bearing-piece onto the collar, it will be understood that other known means of securing may be employed—such, for instance, as solder.

While I prefer to arrange the parts as to their convex and concave shape in the relation described to the concavo-convex flange of the head, and, as seen in Fig. 3, this order may be reversed with the same result, such reversal of the parts is too apparent a modification to require illustration. The arrangement of such a self-adjusting bearing in one head only would be greatly beneficial; but it is preferable that both heads should be provided with the same bearing.

I claim—

The herein-described improvement in fishing-reels, consisting in a bearing composed of a concavo-convex flange formed in the head around the arbor-opening, and a bearing-piece constructed with a tubular shank extending through the said opening, so as to bring the said bearing-piece to rest against one side of the flange around the said opening, combined with a collar upon the reverse side of the said flange and around the tubular shank of the bearing-piece, and the shank connected to the collar, so as to make connection through the head between the bearing-piece on one side and the collar upon the reverse side, the faces of the said collar and of the said bearing-piece in shape corresponding to the concavo-convex flange around the bearing-opening in the head, substantially as described.

In testimony whereof I have signed this specification in the presence of two subscribing witnesses.

ANDREW B. HENDRYX.

Witnesses:
EDWARD N. PECK,
B. J. STONE.